(12) United States Patent
Kurabayashi

(10) Patent No.: US 10,384,125 B2
(45) Date of Patent: Aug. 20, 2019

(54) INFORMATION PROCESSING PROGRAM AND INFORMATION PROCESSING METHOD

(71) Applicant: CYGAMES, INC., Tokyo (JP)

(72) Inventor: Shuichi Kurabayashi, Tokyo (JP)

(73) Assignee: CYGAMES, INC., Tokyo (JP)

( * ) Notice: Subject to any disclaimer, the term of this patent is extended or adjusted under 35 U.S.C. 154(b) by 136 days.

(21) Appl. No.: 15/626,869

(22) Filed: Jun. 19, 2017

(65) Prior Publication Data
US 2017/0282071 A1    Oct. 5, 2017

Related U.S. Application Data

(63) Continuation of application No. PCT/JP2015/080695, filed on Oct. 30, 2015.

(30) Foreign Application Priority Data

Dec. 18, 2014 (JP) .................. 2014-256058

(51) Int. Cl.
*A63F 13/497* (2014.01)
*G06F 9/451* (2018.01)
(Continued)

(52) U.S. Cl.
CPC ........ *A63F 13/497* (2014.09); *A63F 13/2145* (2014.09); *A63F 13/44* (2014.09);
(Continued)

(58) Field of Classification Search
CPC .... A63F 13/497; A63F 13/2145; A63F 13/44; A63F 13/49; A63F 13/52; A63F 13/86; G06F 9/451; G06F 3/04847; G06F 3/0485; G06F 3/0488; G06F 3/04842; H04N 5/765; H04N 5/91
USPC .......................................... 463/43
See application file for complete search history.

(56) References Cited

U.S. PATENT DOCUMENTS 6,699,127 B1    3/2004  Lobb et al.
8,591,332 B1 *  11/2013 Bright .................. A63F 13/42
                                                      273/460
(Continued)

FOREIGN PATENT DOCUMENTS

JP    H09-009202 A   1/1997
JP    2012-156686 A  8/2012
(Continued)

OTHER PUBLICATIONS

Notice of Reasons for Rejection issued in JP Application No. 2014-256058, dated Mar. 24, 2015 (2 pages).
(Continued)

*Primary Examiner* — Allen Chan
(74) *Attorney, Agent, or Firm* — Osha Liang LLP

(57) ABSTRACT

The object of the present invention is to enable an instruction for timeshifted recording in a short time and with a simple operation. A play-video saving control unit 12 controls saving of log data regarding a game being executed. A display control unit 21 executes control so as to display, on a display medium, a plurality of images representing the proceedings of the game in sequential order of time on the basis of the log data in a case where a predetermined condition is satisfied. A touch-operation detecting unit 22 detects an operation of bringing a thing into contact with or in proximity to the display medium as an operation for selecting a certain image from the plurality of images. A recording-period detecting unit 23 determines a timing identified from the certain image selected by the detected operation as a start point for recording of an image representing the proceedings of the game. A play-video recording control unit 15 controls recording of the image representing the proceedings of the game during a duration following the start point on the basis of the saved log data.

8 Claims, 5 Drawing Sheets

(51) Int. Cl.
| | |
|---|---|
| *H04N 5/765* | (2006.01) |
| *H04N 5/91* | (2006.01) |
| *A63F 13/52* | (2014.01) |
| *A63F 13/86* | (2014.01) |
| *A63F 13/2145* | (2014.01) |
| *A63F 13/44* | (2014.01) |
| *G06F 3/0484* | (2013.01) |
| *G06F 3/0488* | (2013.01) |
| *G06F 3/0485* | (2013.01) |
| *A63F 13/49* | (2014.01) |

(52) U.S. Cl.
CPC .............. *A63F 13/49* (2014.09); *A63F 13/52* (2014.09); *A63F 13/86* (2014.09); *G06F 3/0485* (2013.01); *G06F 3/0488* (2013.01); *G06F 3/04847* (2013.01); *G06F 9/451* (2018.02); *H04N 5/765* (2013.01); *H04N 5/91* (2013.01); *G06F 3/04842* (2013.01)

(56) References Cited

U.S. PATENT DOCUMENTS

| | | | |
|---|---|---|---|
| 8,855,472 B2* | 10/2014 | Tagawa | G11B 27/034 386/282 |
| 2005/0235335 A1* | 10/2005 | Morita | G11B 27/031 725/133 |
| 2012/0100910 A1 | 4/2012 | Eichorn et al. | |
| 2013/0172086 A1* | 7/2013 | Ikenaga | A63F 13/10 463/43 |
| 2013/0257770 A1* | 10/2013 | Tsaregorodtsev | G06F 3/0488 345/173 |
| 2014/0094302 A1 | 4/2014 | Wilkiewicz et al. | |
| 2014/0155171 A1 | 6/2014 | Laakkonen et al. | |
| 2014/0156037 A1 | 6/2014 | Laakkonen et al. | |
| 2014/0228112 A1 | 8/2014 | Laakkonen et al. | |
| 2015/0281325 A1 | 10/2015 | Takaichi et al. | |

FOREIGN PATENT DOCUMENTS

| | | |
|---|---|---|
| JP | 2014-092991 A | 5/2014 |
| JP | 2014-121610 A | 7/2014 |
| WO | 2014/100770 A2 | 6/2014 |

OTHER PUBLICATIONS

International Search Report issued in Application No. PCT/JP2015/080695, dated Dec. 15, 2015 (2 pages).

Written Opinion issued in Application No. PCT/JP2015/080695, dated Dec. 15, 2015 (3 pages).

* cited by examiner

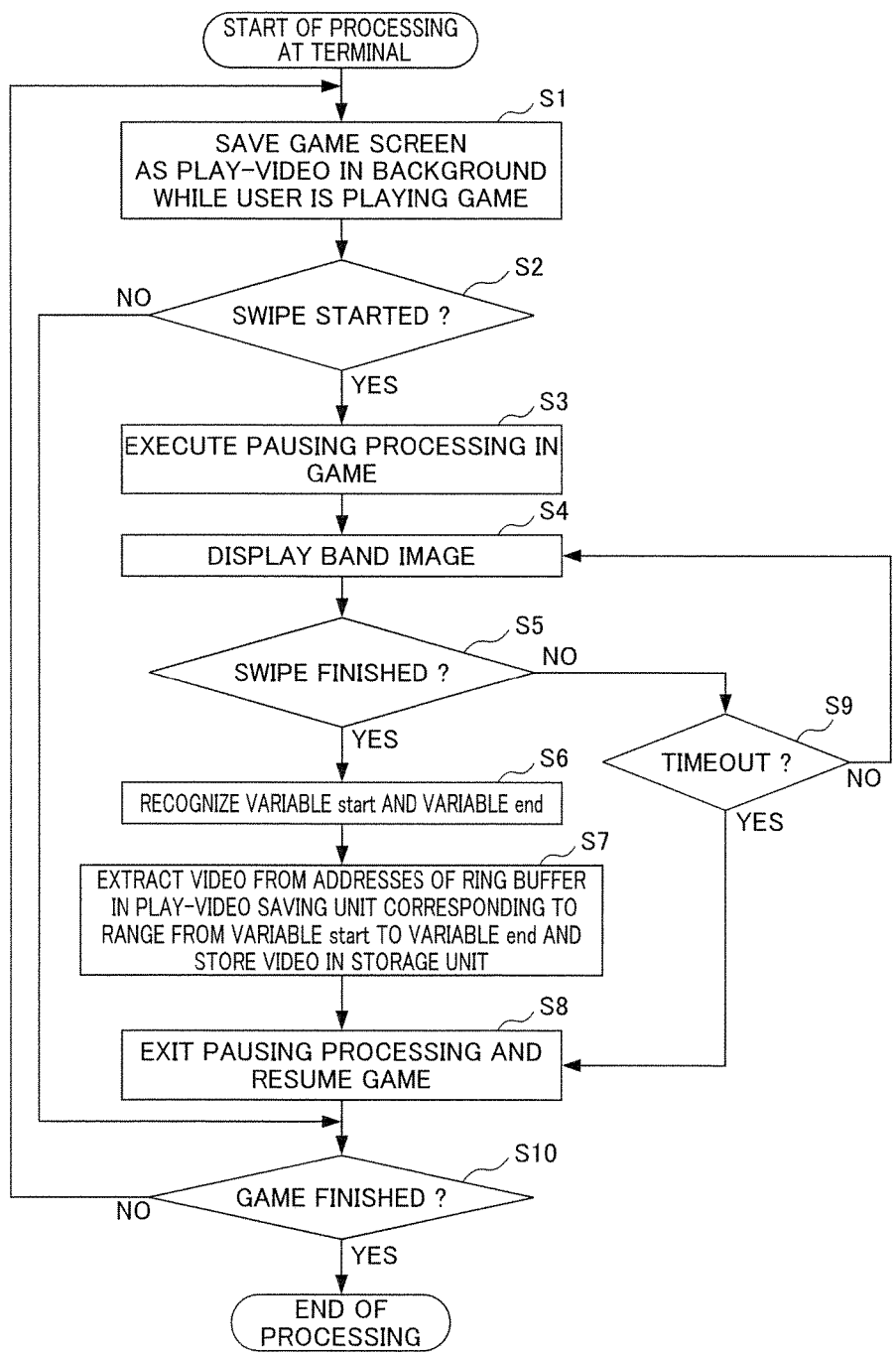

INFORMATION PROCESSING PROGRAM AND INFORMATION PROCESSING METHOD

TECHNICAL FIELD

The present invention relates to information processing programs and information processing methods.

BACKGROUND ART

Recently, in order to share game experience on terminals such as smartphones among players, a large number of video data created by recording game screens during play have been uploaded on the Internet (see Patent Literatures 1 to 7). An environment for this purpose is being established, and many development tools for recording such video data are being provided.

Generally, video data generated by recording game screens during play are often called "play-videos." In addition to such video data, there is also another type of video data, which is generated by capturing video of a player himself or herself together with the proceedings of a game. Generally, such video data is called "Let's Play." Hereinafter, however, these types of video data, including "Let's Play," will be collectively referred to as "play-videos." That is, in this specification, "play-videos" are a broad concept meaning images representing the proceedings of a certain game.

Patent Document 1: Specification of U.S. Pat. No. 6,699,127

Patent Document 2: Specification of United States Patent Application, Publication No. 2012/0100910

Patent Document 3: Specification of United States Patent Application, Publication No. 2014/0094302

Patent Document 4: Japanese Unexamined Patent Application, Publication No. 2014-92991

Patent Document 5: Specification of United States Patent Application, Publication No. 2014/0156037

Patent Document 6: Specification of United States Patent Application, Publication No. 2014/0155171

Patent Document 7: Specification of United States Patent Application, Publication No. 2014/0228112

DISCLOSURE OF THE INVENTION

Problems to be Solved by the Invention

With the existing technologies alone, including those of Patent Literatures 1 to 7, however, it is difficult for a player playing a game to casually create and record a play-video. Accordingly, in order to allow a player playing a game to casually create a play-video, there is a demand for a user interface for instructing recording of a play-video in a short time and with a simple operation, in particular, a user interface for instructing retroactive recording of a play-video of a past play (hereinafter referred to as "timeshifted recording").

The present invention has been made in view of the situation described above, and it is an object thereof to provide a user interface that enables an instruction for timeshifted recording in a short time and with a simple operation.

Means for Solving the Problems

In order to achieve the above object, a non-transitory computer readable medium storing an information processing program according to an aspect of the present invention causes a computer that controls the execution of a game to execute control processing including: a saving control step of controlling saving of log data regarding the game being executed; a display control step of executing control so as to display, on a display medium, a plurality of images representing the proceedings of the game in sequential order of time on the basis of the log data in a case where a predetermined condition is satisfied; a detecting step of detecting an operation of bringing a thing into contact with or in proximity to the display medium as an operation for selecting a certain image from the plurality of images; a determining step of determining a timing identified from the certain image selected by the detected operation as a start point for recording an image representing the proceedings of the game; and a recording control step of controlling recording of the image representing the proceedings of the game in a duration following the start point on the basis of the saved log data.

This makes it possible to provide a user interface that enables an instruction for timeshifted recording in a short time and with a simple operation.

Furthermore, the detecting step may include a step of detecting, as the operation, a series of operations going through a first state, in which the thing has begun to be brought into contact with or in proximity to the display medium, a second state, in which the thing is moved while being maintained in contact with or in proximity to the display medium, and a third state, in which the thing is released from contact with or proximity to the display medium, and the determining step may include a step of determining, as the start point, a timing identified from the certain image selected in the third state.

This makes it possible to realize timeshifted recording with just a single swipe, which is an operation that is intuitive, that is simple, and that completes in a short time.

Furthermore, the display control step may further include a step of executing control so as to display an image selected in the second state in a manner of display different from that for the other images.

This clarifies images that serve as candidates for a start point of timeshifted recording.

Furthermore, the display control step may include a step of determining that the predetermined condition is satisfied when the first state is detected.

This makes it possible to start an operation for timeshifted recording at desired timing during a game play.

Furthermore, the determining step may further include a step of determining an end point for recording an image representing the proceedings of the game on the basis of a timing at which the predetermined condition is satisfied, and the recording control step may include a step of controlling recording of the image representing the proceedings of the game during a duration from the start point to the end point.

This enables time-shifted recording of a play-video of a play up to the start of the operation for timeshifted recording.

Furthermore, the non-transitory computer readable medium may further include a suspending step of suspending the execution of the game in a case where the predetermined condition is satisfied. Here, as the processing in the suspending step, a plurality of kinds of suspension processing are conceivable, including not only processing for suspending the overall proceeding of the game to interrupt the game but also processing for temporarily suspending various kinds of determination processing involved in the execution of the game and processing for temporarily suspending the actions of the player character in the game.

This enables timeshifted recording without disadvantaging the player in the game.

An information processing method corresponding to the information processing program according to the above aspect of the present invention is also provided as an information processing method according to an aspect of the present invention.

Effects of the Invention

The present invention makes it possible to provide a user interface that enables an instruction for timeshifted recording in a short time and with a simple operation.

BRIEF DESCRIPTION OF THE DRAWINGS

FIG. 6 is a flowchart for explaining the flow of timeshifted recording executed by the terminal in FIG. 1.

PREFERRED MODE FOR CARRYING OUT THE INVENTION

An embodiment of the present invention will be described below with reference to the drawings.

It is to be understood that what are simply referred to as "images" hereinafter should be construed to include both "moving images" and "still images." Furthermore, "moving images" should be construed to include images that are displayed individually through the following first processing to third processing. First processing refers to processing for displaying a series of still images, while continuously switching among them as time passes, for individual actions of objects (e.g., game characters) in planar images (2D images). Specifically, two-dimensional animation, i.e., processing similar to what is called book flipping, is an example of first processing. Second processing refers to processing for presetting motions corresponding to individual actions of objects (e.g., game characters) in stereoscopic images (images based on 3D models) and displaying the objects while changing the motions as time passes. Specifically, three-dimensional animation is an example of second processing. Third processing refers to processing for preparing videos (i.e., moving images) corresponding to individual actions of objects (e.g., game characters) and rendering the videos as time passes.

Figure 1:
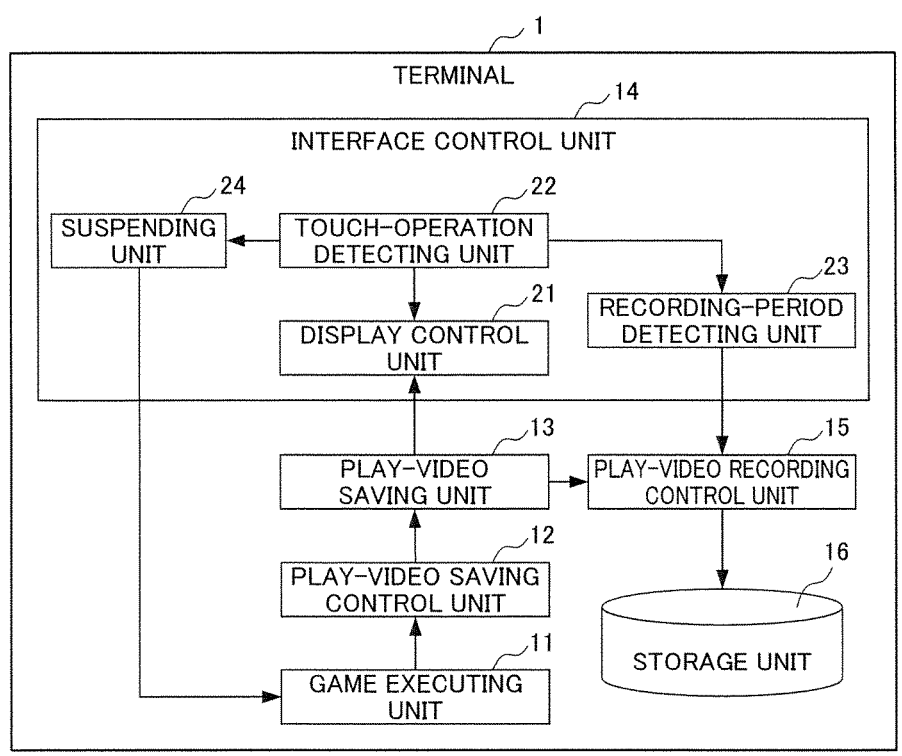
FIG. 1 is a functional block diagram showing the functional configuration of a terminal according to an embodiment of the present invention.

FIG. 1 shows the configuration of a terminal according to an embodiment of the present invention. A terminal 1 in this embodiment is applied to a computer and peripheral devices thereof. The individual units in this embodiment are implemented by hardware provided in a computer and peripheral devices thereof, as well as by software for controlling the hardware.

The hardware includes a CPU (Central Processing Unit) that serves as a control unit, and also includes a storage unit, a communication unit, a display unit, and an input unit. Examples of the storage unit include a memory (RAM: Random Access Memory, ROM: Read Only Memory, etc.), an HDD (Hard Disk Drive), and an optical disk (CD: Compact Disk, DVD: Digital Versatile Disk, etc.) drive. Examples of the communication unit include various types of wired and wireless interface devices. Examples of the display unit include various types of displays, such as a liquid crystal display. Examples of the input unit include a keyboard and a pointing device (a mouse, a trackball, etc.).

The terminal 1 in this embodiment is implemented, for example, as a smartphone and is provided with a touchscreen as a display medium that serves as both an input unit and a display unit. For example, the input unit of the touchscreen is constituted of capacitive or resistive position input sensors that are stacked in the display area of the display unit, which detect the coordinates of a position at which a touch operation is performed. The touch operation here refers to bringing a thing (a user's finger, a stylus, etc.) into contact with or in proximity to the touchscreen (more specifically, the input unit thereof) serving as a display medium. Hereinafter, a position at which a touch operation is performed will be referred to as a "touched position," and the coordinates of the touched position will be referred to as "touched coordinates."

Here, examples of the kinds of touch operations include swipe and flick. However, both swipe and flick are common in that each of these is a series of operations going through a first state, in which a thing has begun to be brought into contact with or in proximity to the display medium (touchscreen), a second state, in which the thing is moved while being maintained in contact with or in proximity to the display medium (a second state in which the touched position moves), and a third state, in which the thing is released from contact with or in proximity to the display medium (a third state, in which the thing is moved away from the display medium). Thus, such a series of operations will be collectively referred to as a "swipe" in this specification. In other words, a "swipe" as referred to in this specification is a broad concept including a flick described above, etc. as well as what is generally called a swipe.

Furthermore, the software includes computer programs and data for controlling the hardware. The computer programs and data are stored in the storage unit and are executed or referred to as appropriate by the control unit. Furthermore, the computer programs and data can be distributed either via a communication line or as recorded on a computer-readable medium, such as a CD-ROM.

The terminal 1 has a functional configuration shown in FIG. 1 in order to enable various operations through cooperation between the hardware and software described above.

The terminal 1 includes a game executing unit 11, a play-video saving control unit 12, a play-video saving unit 13, an interface control unit 14, a play-video recording control unit 15, and a storage unit 16.

The game executing unit 11 executes a certain game.

The play-video saving control unit 12 executes control to generate a play-video while the game is being executed and to save a play-video of a certain length in the play-video saving unit 13. The play-video saving unit 13 is implemented, for example, by a ring buffer described later and shown in FIG. 5 and saves the play-video of the certain length.

Here, a "play-video" as referred to in this specification is a broad concept meaning an image representing the proceedings of a play of a certain game. More specifically, although there are cases where data obtained by recording a game screen during a play is specifically referred to as a "play-video" and video data captured including the player himself/herself is distinctly referred to as a "Let's Play video," these types of images, including "Let's Play videos," are collectively referred to as "play-videos" in this specification.

The interface control unit 14 includes a display control unit 21, a touch-operation detecting unit 22, a recording-period detecting unit 23, and a suspending unit 24.

In the case where a predetermined condition is satisfied, the display control unit 21 executes control to display, on the display medium, a plurality of images, in sequential order of time, representing the proceedings of a game play on the basis of the play-video saved in the play-video saving unit 13. Although a specific example of a display will be described later with reference to FIG. 3, in this embodiment, an image (hereinafter referred to as a "band image") in which thumbnail images (usually still images but may be moving images) representing individual scenes in the game are arrayed in the form of a band in sequential order of time is displayed.

The touch-operation detecting unit 22 detects various kinds of touch operations. A function for selecting a certain image from the band image is assigned to a certain operation among such touch operations. Here, although the certain operation is not particularly limited so long as it is a touch operation, a swipe is adopted in this embodiment. More precisely, as described earlier, a swipe is a touch operation going through the first state to the third state, and an image that is selected in the third state, in which a thing is released from contact with or proximity to the display medium (the third state, in which a thing is moved away from the display medium) is recognized as the certain image to be selected. Furthermore, although the predetermined condition for displaying the band image is not particularly limited, in this embodiment, a condition that a swipe has been detected, i.e., a condition that the first state has been detected, in which a thing has begun to be brought into contact with or in proximity to the display medium (touchscreen), is adopted.

In the case where the operation for selecting the predetermined image has been detected by the touch-operation detecting unit 22, the recording-period detecting unit 23 determines the timing identified from the certain image as a start point for recording a play-video. Also, the recording-period detecting unit 23 determines an end point for recording the play-video on the basis of the timing at which the predetermined condition for displaying the band image is satisfied (the timing at which a swipe is detected). That is, the recording-period detecting unit 23 determines a period for timeshifted recording.

The suspending unit 24 suspends the execution of the game in the case where the above-described predetermined condition for displaying the band image is satisfied, i.e., in this embodiment, in the case where a swipe is detected.

In other words, in this embodiment, the above-described predetermined condition is a condition for starting an operation for instructing timeshifted recording. That is, when a thing such as a finger has begun to be brought into contact with or in proximity to the display medium for a swipe (i.e., upon entering the first state), assuming that the predetermined condition has been satisfied, an operation for instructing timeshifted recording is started, and then the execution of the game is suspended, and the band image is displayed. The period (a duration from a start point to an end point) of timeshifted recording is determined using a swipe along this band image.

The play-video recording control unit 15 executes control to record, in the storage unit 16, a play-video for the duration from the start point to the end point determined by the recording-period detecting unit 23 among the play-videos saved in the play-video saving unit 13. That is, the play-video recording control unit 15 controls the execution of timeshifted recording.

The storage unit 16 stores a play-video. The storage unit 16 need not necessarily be integrated in the terminal 1, and may be, for example, a removable medium. Moreover, the storage unit 16 is not a necessary element of the terminal 1, and may be provided in another device (server, etc.) that is not shown. That is, in the case where the storage unit 16 is provided in another device, the recording control by the play-video recording control unit 15 means control for uploading a play-video to that device.

The information processing system according to this embodiment will be further described below in detail with reference to FIG. 2 and the subsequent figures.

Figure 2:
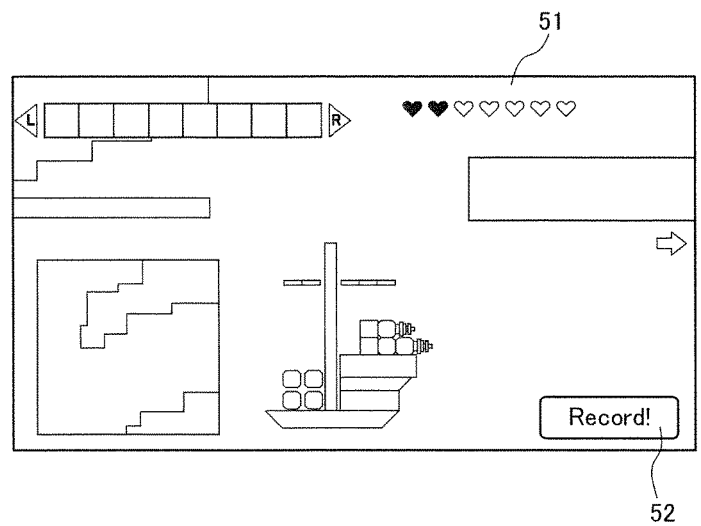
FIG. 2 is an illustration showing an example of a screen that is displayed on the terminal in FIG. 1, in which a record button for starting a timeshifted-recording instructing operation is displayed.

FIG. 2 is an illustration showing an example of a screen that is displayed on the terminal 1 in FIG. 1, including a record button for starting an operation for instructing timeshifted recording during the execution of the game. As shown in FIG. 2, in a screen 51 during the execution of the game, a record button 52 is displayed constantly or at a certain timing. The certain timing may be arbitrary. For example, a timing associated with a play-video presumably having a high demand, representing the proceedings of the game immediately before the timing, i.e., a timing at which the player will be motivated to record a play-video, should be adopted. For example, a timing at which the user achieves a meaningful event, such as beating an enemy boss, executing a difficult killer technique, or achieving the highest score, may be adopted as the certain timing.

Figure 3:
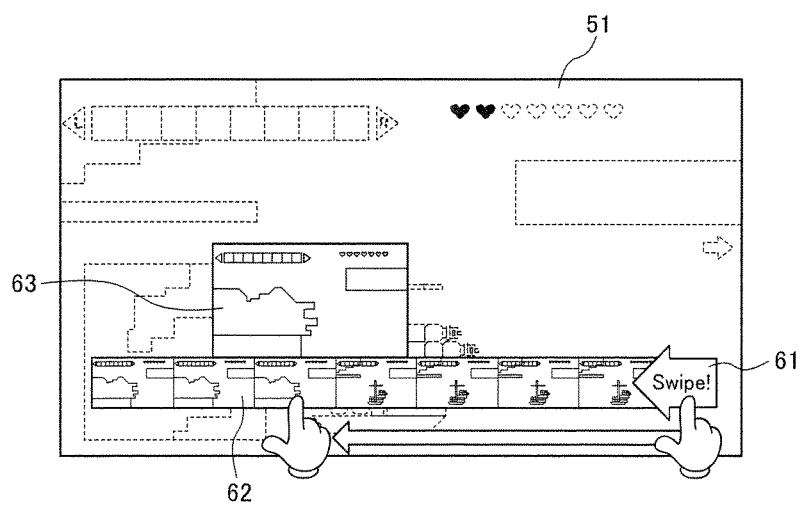
FIG. 3 is an illustration for explaining an example of the timeshifted-recording instructing operation.

FIG. 3 is an illustration for explaining an example of an operation for instructing timeshifted recording.

When the record button 52 in FIG. 2 is pressed, i.e., when a thing such as a player's finger is brought into contact with or in proximity to the record button 52 in FIG. 2, the touch-operation detecting unit 22 in FIG. 1 detects the start of a swipe (the first state).

Upon detection of the start of a swipe (the first state), the suspending unit 24 suspends the execution of the game, and the display control unit 21 displays a band image 62 shown in FIG. 3.

The band image 62 is constituted of a plurality of images extending in a predetermined direction from a swipe start point symbol 61 displayed at the position of the record button 52. In this embodiment, the plurality of images are individual thumbnail images representing the proceedings of a play at individual points of time in the past and are arrayed in sequential order of time going back from the present (the swipe start point) to the past. Here, although the predetermined direction in which the band image 62 extends is not particularly limited, for example, the predetermined direction should preferably be the horizontal direction in the case of a horizontal screen, as shown in FIG. 3, and the vertical direction in the case of a vertical screen, although this is not shown. Although the order of arraying the plurality of thumbnail images is not particularly limited, since a start point of recording is specified with a swipe in this embodiment, a thumbnail image representing the proceedings of a play closest to the present (the swipe start point) should be placed at the position at which a swipe is started, i.e., at the position of the swipe start point symbol 61. Furthermore, the plurality of thumbnail images are arrayed in order from newer to older (in sequential order of time going back from the present to the past) in the swipe direction, i.e., from right to left in the example in FIG. 3. Accordingly, in the second state of the swipe (the state in which the thing such as a finger is maintained in contact or in proximity), the player can slide the thing such as the finger to move the touched position leftward, i.e., sequentially select thumbnail images in the direction toward the past. Thus, the thumbnail image present at the touched position becomes the selected image. Therefore, the selected image represents the proceedings of an older play in the past as the touched position shifts leftward.

Here, for the thumbnail image present at the touched position in the second state of the swipe, i.e., for the selected image, an enlarged image 63 thereof is displayed. The user can readily recognize the currently selected image with reference to the enlarged image 63. For the purpose of allowing visual recognition as to which is the selected image among the plurality of thumbnail images, the manner of display of the selected image need not necessarily be the enlarged display as in FIG. 3; it suffices to display the selected image in a manner different from the manner used for the others. The selected image may be displayed in any manner of display; for example, the selected image may be displayed with a frame in a color different from that for the other images, or the selected image may be displayed so as to include a certain symbol. However, by displaying the selected image in enlarged form, the player can readily recognize the point in time in the past associated with the proceedings of the play represented by the selected image. That is, the enlarged display (the enlarged image 63) helps determine the point in time in the past from which time-shifted recording of the proceedings of the play is to be started.

When the thing such as the player's finger is moved away from the display medium, the touch-operation detecting unit 22 in FIG. 1 detects an end of the swipe (the third state). The recording-period detecting unit 23 detects, as a start point of timeshifted recording, the point in time in the past identified from the thumbnail image selected immediately before the detection of the end of the swipe (the third state). It suffices for the end point of timeshifted recording to be at least later than the start point. In this embodiment, however, the timing identified from the thumbnail image closest to the swipe start point symbol 61, i.e., the timing identified from the thumbnail image representing the proceedings of the play immediately before the start of the swipe, is detected as the end point of timeshifted recording. That is, the detected duration of timeshifted recording is from the recording start point (the point in time in the past selected with the swipe) to the recording end point (the point in time closest to the present).

The play-video recording control unit 15 stores the play-video for the detected duration in the storage unit 16. That is, timeshifted recording is executed.

Figure 4:
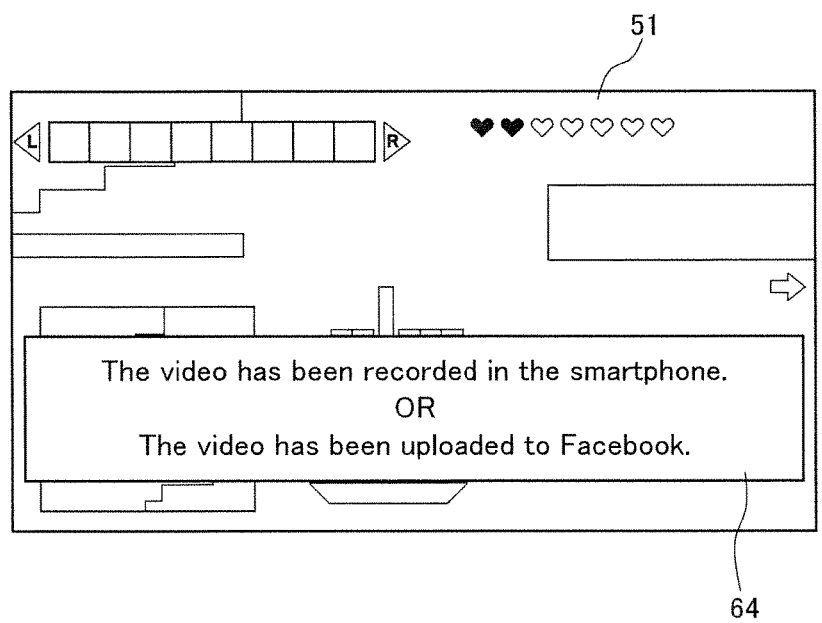
FIG. 4 is an illustration showing an example of the screen displaying a message image to the effect that the execution of timeshifted recording has been completed.

At the end of timeshifted recording, in this embodiment, a message image 64 shown in FIG. 4 is displayed in the screen 51. That is, FIG. 4 is an illustration showing an example of the screen 51 displaying the message image 64 to the effect that the execution of timeshifted recording has been finished. Upon completion of displaying the message image 64, the suspending unit 24 quits suspending the game. That is, the game is resumed.

Figure 5:
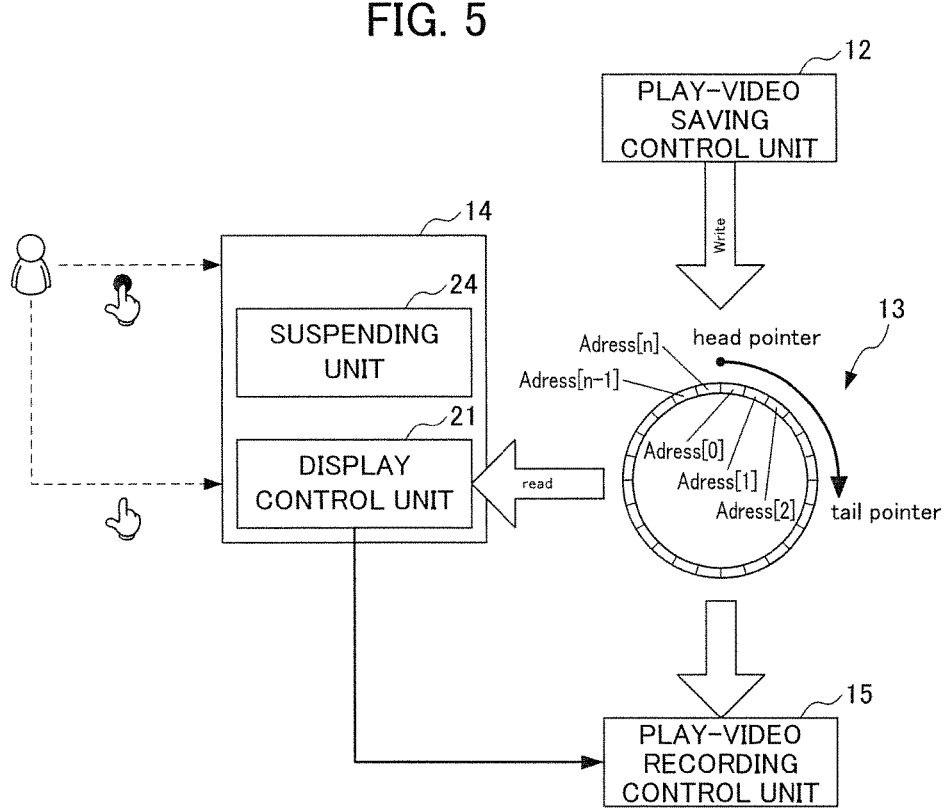
FIG. 5 is a diagram for explaining a specific implementation that enables timeshifted recording with the terminal in FIG. 1.

In order to enable the timeshifted recording described above, in this embodiment, the game screen is constantly being recorded in the background for a certain period, for example, about five to ten minutes. FIG. 5 is a diagram for explaining a specific implementation for enabling time-shifted recording with the terminal 1 in FIG. 1. Although the implementation of the play-video saving unit 13 does not depend on any specific buffer management method, for example, the implementation of the play-video saving unit 13 shown in FIG. 5 may be adopted. The play-video saving unit 13 can be configured in the main memory of the terminal 1 or in a flash memory serving as a secondary storage. In this embodiment, in order to manage the play-video saving unit 13, a head pointer (corresponding to the oldest recordable point of time in the past) storing the beginning address of effective write data and a tail pointer (corresponding to the current point in time) storing the end address of effective write data are provided. This makes it possible to constantly save past image data during a certain period that depends on the buffer size.

The play-video saving control unit 12 constantly records the game screen in the background during a play from the start of the game and keeps storing the game screen in the play-video saving unit 13. As described earlier, many SDKs (Software Development Kits) for recording game screens in the background are already available on the market, and it is possible to implement the play-video saving control unit 12 by using any one of those SDKs.

The interface control unit 14 serves as a user interface that displays the record button 52, that detects touch operations (swipes, etc.) by the player, that determines a start point and an end point of timeshifted recording, etc. Although the details about a swipe will be described later with reference to a flowchart in FIG. 6, with this user interface, an operation for instructing timeshifted recording is detected just with a single swipe, which makes it possible to easily execute timeshifted recording. When the player has invoked time-shifted recording, the suspending unit 24 executes pausing processing (i.e., suspension) as processing for suspending the game such that the player will not suffer a disadvantage in the game. This suspension processing has to be customized for each game title, and thus various implementations are assumed. For example, in the case of a game in which multiple players participate online, it is conceivable to implement processing such that the character of a user who has invoked the timeshifted recording function is temporarily (for about two to three seconds) made not subject to damage and is prevented from acting in the game. In the case of a single-player game, the processing can be implemented simply in the form of suspension of the screen. The display control unit 21 successively generates data of thumbnail images, which are images of a smaller size, at regular intervals (e.g., at intervals of one second) from the video stream recorded in the play-video saving unit 13. Then, the display control unit 21 displays a band image (the band image 62 in the example in FIG. 3) in which a plurality of individual thumbnail images are arrayed along a time axis going backward from the present to the past. This enables the player to intuitively specify a start point (variable start) of timeshifted recording.

The play-video recording control unit 15 receives the two variables set by the interface control unit 14 (specifically the recording-period detecting unit 23 in FIG. 1), i.e., a start point (variable start) and an end point (variable end: the current time immediately before suspension) of timeshifted recording. Then, the play-video recording control unit 15 extracts video data of the duration identified from the two variables from the play-video saving unit 13 and stores the video data as a play-video in the storage unit 16 (FIG. 1). Specifically, the play-video recording control unit 15 searches the play-video saving unit 13 (ring buffer) for the frame corresponding to the time information of the start point (variable start) of timeshifted recording and sets the address corresponding to the frame obtained by the search as a copying start address. Furthermore, the play-video recording control unit 15 sets the end address (the tail pointer in FIG. 5) of write data in the play-video saving unit 13 (ring buffer) as a copying end address. Then, the play-video recording control unit 15 reads the data of individual frames from the copy start address to the copy end address of the play-video saving unit 13 (ring buffer), generates a play-video from the data, and stores the play-video in the storage unit 16 (or uploads the play-video in the case where the storage unit 16 is provided externally).

Next, of the processing executed by the terminal in FIG. 1, a series of processing steps from accepting an operation for instructing timeshifted recording to executing timeshifted recording (hereinafter referred to as a "timeshifted recording process") will be described with reference to FIG. 6. That is, FIG. 6 is a flowchart for explaining the flow of the timeshifted recording process.

The timeshifted recording process is triggered when the user begins to play the game.

In step S1, the play-video saving control unit 12 saves the game screen as a play-video in the play-video saving unit 13 (ring buffer) in the background of the game screen while the user (player) is playing the game.

In step S2, the touch-operation detecting unit 22 of the interface control unit 14 determines whether a swipe has been started. In the case where the first state, in which a thing such as a user's finger has begun to be brought into contact with or in proximity to the display medium, is not detected, the determination in step S2 results in NO, and the process proceeds to step S10.

In step S10, the game executing unit 11 determines whether the game has ended. In the case where the game has ended, the determination in step S10 results in YES, and the timeshifted recording process is finished. On the other hand, in the case where the game is being continued, the determination in step S10 results in NO, and the process returns to step S1. That is, while the game is being played, the loop processing through step S1, NO in step S2, and NO in step S10 is repeated until a swipe is started, and the game screen is continuously saved as a play-video in the background in the play-video saving unit 13 (ring buffer).

In the case where the first state, in which a thing such as a user's finger has begun to be brought into contact with or in proximity to the display medium, is detected, which is considered to be the start of a swipe, the determination in step S2 results in YES, and the process proceeds to step S3.

In step S3, the suspending unit 24 executes pausing processing in the game.

In step S4, the display control unit 21 of the interface control unit 14 displays a band image in which a plurality of thumbnail images are arrayed in the direction going backward in time.

In step S5, the interface control unit 14 determines whether the swipe has been finished. In the case of the second state, in which the thing (the user's finger, etc.) is moved while being maintained in contact with or in proximity to the display medium, the determination in step S5 results in NO, and the process proceeds to step S9. In step S9, the game executing unit 11 determines whether a timeout has occurred. In the case where a predetermined time limit has not expired since the start of the swipe, the determination in step S9 results in NO, and the process returns to step S4. That is, in the case where the second state of swipe is being maintained, the loop processing through step S4, NO in step S5, and NO in step S9 is repeated until a timeout occurs, and the band image is continuously displayed. As described earlier, in the case where the second state of swipe is being maintained, assuming that the thumbnail image at the touched position is selected, the thumbnail image is displayed in enlarged form, etc. When the time limit expires while the second state of the swipe is being maintained, a timeout occurs, the determination in step S9 results in YES, and the process proceeds to step S8. In step S8, the suspending unit 24 quits the pausing processing, and the game executing unit 11 resumes the game.

When the state changes before a timeout occurs from the second state of the swipe to the third state, in which the thing (the user's finger, etc.) is released from contact with or proximity to the display medium, which is considered as completion of the swipe, the determination in step S5 results in YES, and the process proceeds to step S6. In step S6, the recording-period detecting unit 23 of the interface control unit 14 recognizes a start point (variable start) and an end point (variable end: the current time immediately before step S3) of timeshifted recording.

In step S7, the play-video recording control unit 15 extracts data of video (individual frames) from the addresses in the ring buffer of the play-video saving unit 13 corresponding to the variable start to the variable end and stores the video in the storage unit 16.

In step S8, the suspending unit 24 quits the pausing processing, and the game executing unit 11 resumes the game. Then, the process proceeds to step S10, and the processing described above is repeated.

As described above, the terminal 1 in this embodiment realizes a user interface that makes it possible to specify a suitable time range (duration) in a play-video of a game just with a single swipe executed at an arbitrary timing during a game play, thereby enabling the execution of timeshifted recording. A play-video that is recorded by the timeshifted recording in this embodiment is stored in the storage unit 16. The location of the storage unit 16 is not particularly limited, and the storage unit 16 may be located inside the terminal 1, as shown in FIG. 1, or located in a server (not shown) for an SNS, etc. In the case of a server (not shown) for an SNS, etc., the play-video is uploaded from the terminal 1. By implementing the timeshifted recording function of this embodiment in a smartphone game, it becomes possible to widely promote creation and sharing of game play-videos among a large number of casual users, for whom it has not been possible to casually create play-videos with the existing technologies. That is, an operation for going backward from the current time along the available duration of a play-video recorded in the background during a game play in order to specify a recording range (duration) of the play-video retroactively from an arbitrary point in time can be realized in the form of a swipe operation starting from pressing a recording start button. That is, the player can bring a thing such as a finger into contact with or in proximity to a button on the screen in order to execute timeshifted recording (first state), slide the thing such as a finger while keeping it in contact with or proximity to the screen (second state), and release the thing such as a finger from the screen at a desired position (third state), thereby setting two parameters, namely, a start point (set in the third state) and an end point (set in the first state) of timeshifted recording. Such a swipe going through the first state, the second state, and the third state is a simple operation that completes in a short time of about less than two seconds. It becomes possible to readily create and share a play-video just in a short time and with a simple operation. Existing methods of creating play-videos include a method in which recording is executed in preset time units in a game and a method in which recording is started when a record button is pressed. Compared with these existing methods of creating play-videos, the terminal 1 in this embodiment is advantageous in that it allows the execution of timeshifted recording (retroactive recording of a play-video) anytime without having to suspend the game for a long time.

In other words, the terminal 1 in this embodiment has an advantage of immediacy. Specifically, immediacy means that it is possible to execute timeshifted recording anytime during a game play without having to suspend the game for a long time. In particular, immediacy is effective in that it is possible to create a play-video involving an accidental result that was not planned to be recorded in advance and in that a casual user who has no habit of capturing play-videos can casually create play-videos. Furthermore, since it is because of this immediacy that a player can casually create play-videos, it becomes possible to make it a mission to create play-videos in a game.

Furthermore, the terminal 1 in this embodiment also has the following advantages.

For example, there is an advantage of compatibility. The user interface described above can be implemented together with any SDK for recording game videos. That is, it is possible to implement this embodiment without depending on any specific method of recording a play-video.

As another example, there is also an advantage of uniqueness. The smartphone user interface for recording a game play-video is highly unique.

As another example, there is also an advantage of versatility. The information processing program in this embodiment can be incorporated both in single-player games and in multi-player games. Furthermore, the user interface described above does not depend on any specific game genre and can be applied to a wide range of game genres including action games, RPGs, shooting games, and simulation games.

Patent Literatures 1 to 7 mentioned earlier relate to methods of recording play-videos and methods of recording metadata accompanying play-videos and do not involve user interfaces for invoking timeshifted recording. Therefore, with the inventions according to Patent Literatures 1 to 7, even if combined with each other, it is not possible to realize a function equivalent to the above described interface for executing timeshifted recording in a short time and with a simple operation.

Specifically, the invention according to Patent Literature 1 is directed to replaying a game play in real time. According to this invention, key frames are stored in association with information input by the player, which enables real-time recording and playback of replays. The terminal 1 in this embodiment differs in that it provides a user interface for retroactive recording from the current time, i.e., timeshifted recording, in order to generate a play-video (video file) that is exported or uploaded to an external location. Thus, for the purpose of creating and sharing play-videos, the terminal 1 in this embodiment makes it possible to specify a start point and an end point of recording of a play-video in a short time and with a simple operation. In contrast, the invention according to Patent Literature 1 does not even involve a user interface for specifying a start point and an end point of a video.

The invention according to Patent Literature 2 is directed to recording play-videos in the background. Specifically, in the invention according to Patent Literature 2, as real-time processing, a play-video of a game is rendered in the background as low-quality video data with low computation cost. At this time, in the invention according to Patent Literature 2, the sequence of game play is recorded and durations or certain times of the play-video are tagged as events occur in the game. When the user requests export processing of the play-video, the user is presented with the low-quality video data and is prompted to select tags to set a duration of the video data to be exported. After this setting, the device generates replay video data from the game play sequence to regenerate high-quality video. The terminal 1 in this embodiment differs in that it realizes a user interface for retroactive recording from the current time (timeshifted recording) in the form of a generic user interface that does not depend on auxiliary information such as tags. Owing to this feature, the terminal 1 in this embodiment can be readily applied to action games or rhythm games in which tagging is difficult. In contrast, the invention according to Patent Literature 2 does not define a user interface or user interaction for retroactive recording. Therefore, it is not possible to realize a function equivalent to the timeshifted recording described above.

The invention according to Patent Literature 3 is directed to sending game play status information (status data in the game, and information about input events, such as mouse clicking, screen tapping, keyboard inputs, and smartphone inclination) to a cloud in real time and generating a play-video in real time on the cloud side. The terminal 1 in this embodiment differs in that it realizes a user interface for retroactive recording from the current time (timeshifted recording) either with recording on a cloud or recording on a mobile terminal. In contrast, the invention according to Patent Literature 3 is directed exclusively for rendering on a cloud and does not define a user interface or user interaction for timeshifted recording. Therefore, it is not possible to realize a function equivalent to the timeshifted recording described above.

The invention according to Patent Literature 4 is directed to an exclusive game machine having a SHARE function. The SHARE function makes it possible to record screenshots or videos of a game being played by pressing a SHARE button physically implemented on a controller. The terminal 1 in this embodiment differs in that it realizes a touchscreen-based user interface for retroactive recording (timeshifted recording). In contrast, the SHARE function realized by the invention according to Patent Literature 3 does not provide a touchscreen-based user interface and does not provide a user interface for timeshifted recording from a time when the button is pressed. Therefore, it is not possible to realize a function equivalent to the timeshifted recording described above.

The invention according to Patent Literature 5 is directed to associating game scores with play-videos and posting the scores and play-videos to a shared score board to share play-videos among users in accordance with the score levels. The invention according to Patent Literature 6 relates to a method of recording play-videos and a method of adjustment for replaying play-videos. Specifically, according to Patent Literature 6, a video stream representing the user's face, a video stream representing the game screen, a sound track, sound effects, game control information, statistical information about the game status, data input to the user interface, event information in the game, etc. are recorded individually as independent streams. A user who views the play-video picks up or discards these individual streams at the time of viewing to perform various adjustments. The invention according to Patent Literature 7 is directed to storing metadata in a game along the time axis of a play-video, which enables application to automatic editing and searching of the play-video. These inventions according to Patent Literature 5 to 7 do not involve a definition of a user interface for capturing a play-video and thus do not realize a function equivalent to the timeshifted recording described above.

It is to be noted that the present invention is not limited to the above-described embodiment and that modifications, improvements, etc. within a scope in which it is possible to achieve the object of the present invention are encompassed in the present invention.

For example, although the play-video saving unit 13 saves the video data itself that is presented on the screen in the above-described embodiment, there is no particular limitation to this embodiment. For example, since a band image and a play-video can be reproduced from log data including a sequence of a certain number of internal parameters, the play-video saving unit 13 may save the log data.

As another example, although a thumbnail image selected in the second state of the swipe in the band image is displayed in enlarged form in the above-described embodiment, there is no particular limitation to this embodiment. As described earlier, for the purpose of letting the player recognize that the thumbnail is selected, it suffices to display the thumbnail image selected in the second state of the swipe in a manner different from that for the other thumbnail images. The manner of display that is varied is not particularly limited; for example, the display color may be varied.

As another example, in the above-described embodiment, a band image in which a plurality of images are arrayed in the form of a band is displayed, and an image selected with a swipe from the plurality of images is specified as a start point of timeshifted recording; however, the method of specifying a start point of timeshifted recording is not particularly limited to this method. For example, a player may specify a start point and an end point of timeshifted recording by repeating taps. In other words, an arbitrary operation may be adopted as a touch operation for specifying a start point and an end point of timeshifted recording. Furthermore, what is specified need not necessarily be a band image. It suffices that a plurality of images representing the proceedings of the game are displayed on the display medium in sequential order of time. Also, the sequential order of time is not particularly limited as long as the order follows a certain rule and can be recognized by the player.

In other words, an information processing program according to the present invention may be embodied in various forms for causing an arbitrary computer to execute control processing including the following steps, including the case where the processing is executed in the terminal 1 according to the above-described embodiment shown in FIG. 1. That is, an information processing program according to the present invention is an information processing program for causing a computer that controls the execution of a game to execute control processing including: a saving control step of controlling saving of log data regarding the game being executed (e.g., a step executed by the play-video saving control unit 12 in FIG. 1); a display control step of executing control so as to display, on a display medium, a plurality of images representing the proceedings of the game in sequential order of time on the basis of the log data in a case where a predetermined condition is satisfied (e.g., a step executed by the display control unit 21 in FIG. 1); a detecting step of detecting an operation of bringing a thing into contact with or in proximity to the display medium as an operation for selecting a certain image from the plurality of images (e.g., a step executed by the touch-operation detecting unit 22 in FIG. 1); a determining step of determining a timing identified from the certain image selected by the detected operation as a start point for recording an image representing the proceedings of the game (e.g., a step executed by the recording-period detecting unit 23 in FIG. 1); and a recording control step of controlling recording of the image representing the proceedings of the game in a duration following the start point on the basis of the saved log data (e.g., a step executed by the play-video recording control unit 15 in FIG. 1).

This makes it possible to provide a user interface that enables an instruction for timeshifted recording in a short time and with a simple operation.

The series of processing steps described above may be executed either by hardware or by software. In other words, the functional configuration in FIG. 1 is only an example, and there is no particular limitation to this example. That is, it suffices that an information processing system be provided with functions that enable the execution of the above-described series of processing steps as a whole, and the configuration of functional blocks for implementing the functions is not particularly limited to the example in FIG. 1. Furthermore, the locations of the functional blocks are not particularly limited to those in FIG. 1 and may be arbitrarily set. Furthermore, each functional block may be implemented by hardware alone, by software alone, or by a combination of hardware and software.

In a case where the series of processing steps is executed by software, a program constituting the software is installed on a computer, etc. via a network or from a recording medium. The computer may be a computer embedded in special hardware. Alternatively, the computer may be a computer that can execute various functions when various programs are installed thereon, such as a server or a general-purpose smartphone or personal computer.

A recording medium including such a program can be implemented not only by a removable medium (not shown) that is distributed separately from the main unit of the apparatus in order to provide the program to a user but also by a recording medium that is provided to a user as embedded in the main unit of the apparatus, etc.

In this specification, steps dictated in the program recorded on the recording medium may include not only processing that is executed sequentially in order of time but also processing that is not executed sequentially in order of time but is executed in parallel or individually. Furthermore, in this specification, the term "system" should be construed to mean an overall apparatus constituted of a plurality of devices, a plurality of means, etc.

EXPLANATION OF REFERENCE NUMERALS

1 Terminal
11 Game executing unit
12 Play-video saving control unit
13 Play-video saving unit
14 Interface control unit
15 Play-video recording control unit
16 Storage unit
21 Display control unit 22 Touch-operation detecting unit
23 Recording-period detecting unit
24 Suspending unit

The invention claimed is:

1. A non-transitory computer readable medium storing an information processing program for causing a computer that controls the execution of a game to execute control processing comprising:
   a saving control step of controlling saving of log data regarding the game being executed;
   a display control step of executing control so as to display, on a display medium, a plurality of images representing the proceedings of the game in sequential order of time on the basis of the log data in a case where a predetermined condition is satisfied;
   a detecting step of detecting an operation of bringing a thing into contact with or in proximity to the display medium as an operation for selecting a certain image from the plurality of images;
   a determining step of determining a timing identified from the certain image selected by the detected operation as a start point for recording an image representing the proceedings of the game;
   a recording control step of controlling recording of the image representing the proceedings of the game in a duration following the start point on the basis of the saved log data; and
   a suspending step of suspending the execution of the game in the case where the predetermined condition is satisfied.

2. The non-transitory computer readable medium according to claim 1, wherein the detecting step includes a step of detecting, as the operation, a series of operations going through a first state, in which the thing has begun to be brought into contact with or in proximity to the display medium, a second state, in which the thing is moved while being maintained in contact with or in proximity to the display medium, and a third state, in which the thing is released from contact with or proximity to the display medium, and wherein the determining step includes a step of determining, as the start point, a timing identified from the certain image selected in the third state.

3. The non-transitory computer readable medium according to claim 2, wherein the display control step further includes a step of executing control so as to display an image selected in the second state in a manner of display different from that for the other images.

4. The non-transitory computer readable medium according to claim 2, wherein the display control step includes a step of determining that the predetermined condition is satisfied when the first state is detected.

5. The non-transitory computer readable medium according to claim 1, wherein the determining step further includes a step of determining an end point for recording an image representing the proceedings of the game on the basis of a timing at which the predetermined condition is satisfied, and the recording control step includes a step of controlling recording of the image representing the proceedings of the game during a duration from the start point to the end point.

6. The non-transitory computer readable medium according to claim 1, wherein the plurality of images are a plurality of thumbnail images, and wherein selecting the certain image causes an enlarged image to be displayed of the certain image together with the certain image.

7. An information processing method executed by an information processing device that executes a game, the information processing method comprising:
   a saving control step of controlling saving of log data regarding the game being executed;
   a display control step of executing control so as to display, on a display medium, a plurality of images representing the proceedings of the game in sequential order of time on the basis of the log data in a case where a predetermined condition is satisfied;
   a detecting step of detecting an operation of bringing a thing into contact with or in proximity to the display medium as an operation for selecting a certain image from the plurality of images;
   a determining step of determining a timing identified from the certain image selected by the detected operation as a start point for recording an image representing the proceedings of the game;
   a recording control step of controlling recording of the image representing the proceedings of the game in a duration following the start point on the basis of the saved log data; and
   a suspending step of suspending the execution of the game in the case where the predetermined condition is satisfied.

8. A non-transitory computer readable medium storing an information processing program for causing a computer that controls the execution of a game to execute control processing comprising:
   a saving control step of controlling saving of log data regarding the game being executed;
   a display control step of executing control so as to display, on a display medium, a plurality of images representing the proceedings of the game in sequential order of time on the basis of the log data in a case where a predetermined condition is satisfied;
   a detecting step of detecting an operation of bringing a thing into contact with or in proximity to the display medium as an operation for selecting a certain image from the plurality of images;
   a determining step of determining a timing identified from the certain image selected by the detected operation as a start point for recording an image representing the proceedings of the game and determining a predetermined timing after the start point as an end point for the recording; and
   a recording control step of controlling recording of the image representing the proceedings of the game in a duration from the start point to the end point on the basis of the saved log data,
   wherein the detecting step includes a step of detecting, as the operation, a series of operations going through a first state, in which the thing has begun to be brought into contact with or in proximity to the display medium, a second state, in which the thing is moved while being maintained in contact with or in proximity to the display medium, and a third state, in which the thing is released from contact with or proximity to the display medium,
   wherein the display control step includes:
      a step of determining that the predetermined condition is satisfied when the first state is detected;
      a step of executing control so as to display, an image closest in time among the plurality of images when the first state is detected, at a position at which the series of operations is started; and
      a step of executing control so as to display, the plurality of images in the direction of movement of the thing in order from newer to older when the second state is detected, wherein the determining step includes:
- a step of determining, as the start point, a timing identified from the certain image selected in the third state; and
- a step of determining, as the end point, a timing identified from the image that is closest in time when the first state is detected.

* * * * *